Aug. 18, 1959   F. J. HAHN   2,900,152
FISH POLE HOLDER
Filed Sept. 20, 1954
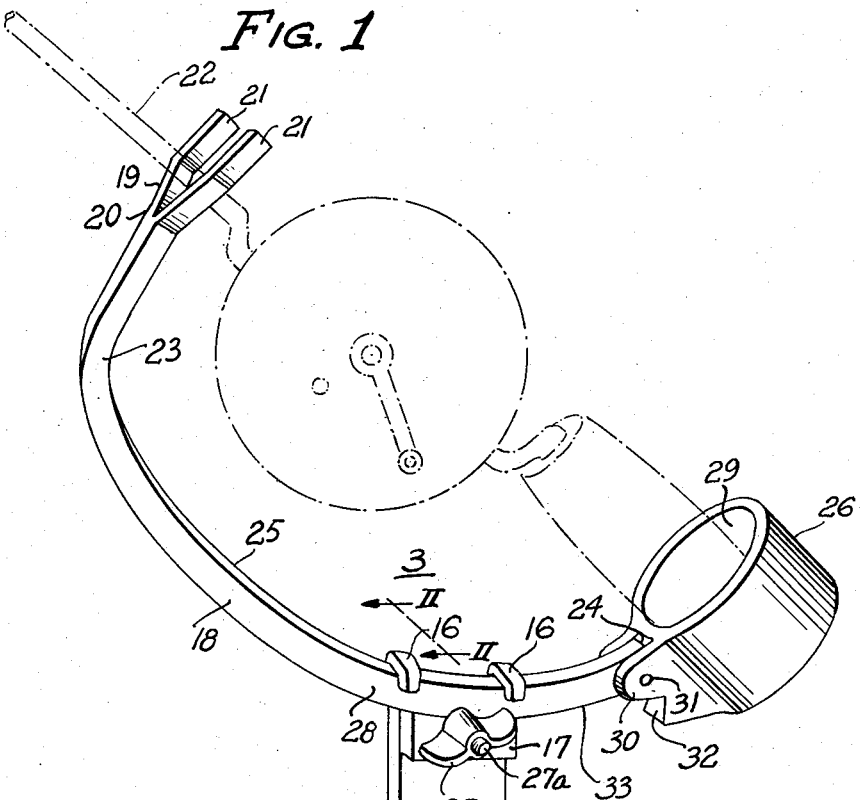
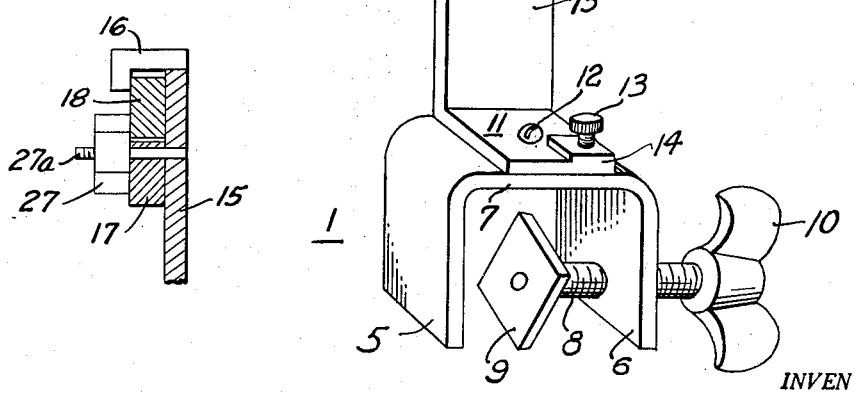
INVENTOR.
FRANK J. HAHN
BY
Zugelter & Zugelter
Attys.

United States Patent Office 2,900,152
Patented Aug. 18, 1959

2,900,152

FISH POLE HOLDER

Frank J. Hahn, Delhi Hills, Ohio

Application September 20, 1954, Serial No. 456,956

2 Claims. (Cl. 248—42)

This invention relates to fish pole holders, and more particularly to fish pole holders adapted to serve as a rest for the butt end of a fish pole and as a fish pole holder.

An object of this invention is to provide a sturdy fish pole holder of simple construction suited for manufacture at a reasonable cost.

Another object of this invention is to provide a fish pole holder of the above character adapted for mounting upon a wide variety of supporting members adjacent positions at which a fisherman may station himself while seeking to catch fish.

Another object of this invention is to provide a fish pole holder of the above described character adapted for supportingly engaging the handle portion of a fishing rod equipped with a reel so as to hold said rod and reel in a predetermined position facilitating removal of the rod from engagement with the support by one hand while the reel is operated with the other hand, thereby minimizing the time interval between the taking of a bait by a fish and commencement of operation of the fishing tackle by the fisherman.

Another object of this invention is to provide a fish pole holder of the above character having a clamp member adapted for engaging a portion of a boat such as the gunwale, the rail, or other parts thereof, or a stake or branch or other object on the shore of a water body, a post pivotally secured to the clamp portion, means for locking the post in non-rotating relation to the clamp portion, a pair of spaced fingers and an abutment guide block spaced therefrom adjacent the upper end of the post adapted to co-operate with a portion of a fishing rod support cradle adapted for binding engagement with co-operating portions of the post and means for locking same in predetermined position, said cradle having a pivoted socket mounted adjacent one end thereof for receiving the butt end of a fish pole and having a pair of fish pole gripping fingers adjacent its other end.

A further object of this invention is to provide a fish pole holder of the above described character having a fish pole supporting cradle adapted to hold a fish pole in predetermined position relative thereto without interference to operation of a reel mounted upon said pole.

A further object of this invention is to provide a fish pole holder of the above character having a pivotally mounted fish pole butt-receiving socket adapted for holding the butt of a fish pole supported in said holder, and for also supporting the butt of a fish pole resting therein incident to manipulation of the pole and reel when other portions thereof are out of contact with other portions of the holder.

The above and other features and objects of the invention will be apparent to those having ordinary skill in the art to which this invention pertains from the following description taken in conjunction with the accompanying drawing, in which:

Figure 1 is a perspective view of a fish pole holder embodying my invention, a fish pole assembly supported thereby being shown in dot-dash lines; and Fig. 2 is a view in section taken on the line II—II in Fig. 1.

The device shown in the drawing presently appears to be a preferred form of embodiment of my invention comprising a clamp unit 1, support post 2, and fish pole supporting cradle 3. Clamp unit 1 comprises a channel-shaped C-frame of substantially rectangular form in section having arm or flange portions 5 and 6 extending in spaced substantially parallel relation to each other, joined together by web portion 7. A threaded aperture is provided in arm 6 for receiving jack screw 8 in threaded engagement with arm 6. A contact pad 9, pivotally secured to jack screw 8 adjacent the end thereof disposed intermediate arms 5 and 6, is free to tilt within limits from the normal position parallel to arms 5 and 6 to better engage a support (not shown). As shown, the end of jack screw 8 remote from contact pad 9 is provided with a suitable hand grip 10 to facilitate rotation of jack screw 8, for firmly clamping contact pad 9 and arm 5 in gripping engagement with a supporting member. Support post 2 has a base plate portion 11 secured in face-to-face relation to web 7 by pivot pin 12. Pivot pin 12 extends centrally through base portion 11 and web 7. Pin 12 may have enlarged end portions co-operating with web 7 and base portion 11 to hold their adjacent faces in face-to-face relation, free to pivot relative to each other. A locking screw 13 threadedly advanceable through an aperture provided in base portion 11 spaced from pin 12 is adapted to engage the opposed face of web portion 7 for locking support post 2 in non-rotating relation with clamp unit 1. Base portion 11 may be thickened, as at 14, to provide greater threaded engagement of thumb screw 13 therewith.

Post portion 15, unitary with base portion 11, extends substantially perpendicularly therefrom to a pair of spaced finger-like members 16 which are integral extensions of post portion 15. Fingers 16 adjacent their roots extend mutually parallel and perpendicularly to post portion 15 and adjacent their free ends extend in parallel spaced relation toward base portion 11. An abutment block 17 integral with or fixedly secured to post 15 extends transversely of post portion 15. Abutment 17 is spaced from fingers 16 and co-operates therewith as guiding and holding means for cradle 3.

The fish pole holder shown in the drawings has a cradle which comprises an elongated bar portion 18 of substantially rectangular cross-section. One end of bar member 18 is bifurcated to provide a pair of fingers 19. Fingers 19 are integrally joined to bar 18 at 20 from which point they divergingly extend to parallel tip portions 21 to form a notch having a V-bottom and parallel sided upper portion for receiving a portion of a fish pole 22. Bar 18, from point 20, extends substantially straight to a sharply curved or bent portion 23. The remainder of bar 18 extending from curved portion 23 to end 24 thereof is bent in varying degrees of curvature which vary from a nearly uncurved or straight portion at the point 25 to more sharply curved portion adjacent the end 24 of bar 18.

Substantially straight portion 25 permits assembly and disassembly of bar 18 from co-operative relation with the slideway between fingers 16 and abutment 17. The face of bar 18 indicated by the lead line of reference character 25 is advanced into abutment with the co-operating face of the fingers 16 and when so positioned, bar 18 may be swung into place with its under face in substantial engagement with abutment 17.

The varied curvature of bar 18 between end 24 thereof and the straight portion adjacent point 20 permit adjustment of the cradle to support fish pole 22 in a wide range of inclined positions with the butt thereof confined in a cup-like socket 26 and a portion thereof spaced from the cup-supported portion resting in the notch between fingers 19.

Bar 18 is easily slid longitudinally between fingers 16 and abutment 17 for adjustment of altitudinal inclination of the cradle while the curvature of the bar 18 and the weight distribution of the cradle facilitate locking same in frictional engagement with one of the fingers 16 and abutment 17 at other times. I prefer to provide a thumb screw 27 threadedly engaging a projecting portion or stud 27a of post 15 and adapted to engage face 28 of bar 18 for clamping the bar 18 firmly to post 15 in fixed relation thereto.

Adjacent end 24 of bar 18 I provide a socket-like cup 26 having a socket or recess 29 adapted for receiving the butt-end portion of a fish pole with the end thereof engaging the bottom (not shown) of the cup 26. As shown, cup 26 has a pair of ear-like special parallel external tabs 30. A pivot pin 31 co-operates with tabs 30 and bar 18 for securing same to bar 18. I also prefer to provide cup 26 with an abutment 32 adapted to engage the under face 33 of bar 18 for limiting the swinging of cup 26 about pivot pin 31.

A fish pole may be placed in cradle 3 by inserting the butt-end portion in cup 26 and lowering the pole into the V-notch between fingers 19. Fingers 19 resiliently grip pole 22 and substantially preclude rotation thereof.

As shown, the portion of bar 18 between fingers 19 and cup 26 is spaced well away from the normal position of a fish pole supported by cup 26 and fingers 19, providing adequate space for the hand of a fisherman to grasp the fish pole incident to lifting same from the cradle 3 and permitting immediate and substantially unobstructed continuous manipulation of the pole and reel before and as same is lifted from cradle 3.

In playing a fish for an extended period of time a fisherman may tire while manipulating the pole and reel. The butt-end portion of the pole may be rested in cup 26 which is free to pivot into gripping engagement therewith. The pole may then be grasped at a point spaced further from the butt-end thereof, reducing the effort necessarily expended in its manipulation.

It may be noted that cup 26, when empty, will normally tend to swing about pivot pin 31, advancing abutment 33 toward bar 18, thereby positioning cup 26 for convenient insertion of the butt end portion of a fish pole 22.

Having thus described the invention, it will be apparent to those skilled in the art, that various modifications and changes may be made in the illustrated embodiment without departing from the spirit or the scope of the appended claims.

Therefore, what is claimed as new, and desired to be secured by Letters Patent, is:

1. A fishpole holder comprising a channel-shaped clamp frame having a pair of spaced parallel arms integrally joined by a web, a thumb-screw extending in threaded engagement through one of said arms and advanceable toward the other arm, a bracket having a post portion and a base portion extending perpendicularly to the post portion, a pivot pin securing the base portion of the bracket in face-to-face abutment with said web, said bracket having locking means spaced from said pivot pin and adapted to co-operate with said web for precluding rotation of the bracket relative to said web, a pair of spaced hook-shape integral fingers extending from said base portion, the tip portion of each finger extending parallel to said post portion and toward said base portion, an abutment block parallel to said post portion and spaced from said fingers on said post portion, an elongate curved cradle bar having a portion adjacent one of its ends bifurcated to form a pair of resilient fishpole gripping fingers defining a fish pole receiving V-notch, a cup member pivotally mounted on the other end of the cradle bar for receiving and co-operating with the butt-end portion of a fish pole, said cup being biased to swing toward mouth-upward position to receive the butt end portion of a fish pole and swing in substantial alignment therewith when so engaged, said curved cradle bar being slidably received between said abutment block and fingers and being adapted to engage said block and at least one of said fingers for locking said cradle in position relative to said post, a clamp for clamping said cradle in fixed position against said post, whereby a fish pole may be held in position as desired readily operable and removable by a fisherman..

2. A fish pole holder comprising a bracket having a base portion and an upstanding post portion, a pair of spaced hook-shaped integral fingers extending in fixed relation from the post portion spaced from the base portion, tip portions of said fingers extending substantially parallel to the post portion toward the base portion, an abutment block mounted on and extending transversely of the post portion spaced from said fingers, an elongate curved downwardly arched cradle bar, means at opposite ends of the cradle bar for receiving and supporting spaced sections of a butt end portion of a fish pole, said cradle bar being non-rotatable relative to said post portion about an axis parallel to said upstanding post portion and being slidably received between the abutment block and the fingers and being adapted to frictionally engage said block and at least one of said fingers under influence of off-center loading by the fish pole for locking the cradle in selected position relative to the bracket.

References Cited in the file of this patent

UNITED STATES PATENTS

| | | |
|---|---|---|
| 704,991 | Warren | July 15, 1902 |
| 2,243,388 | Magyarosi | May 27, 1941 |
| 2,416,828 | Hamre | Mar. 4, 1947 |
| 2,430,112 | Hamre | Nov. 4, 1947 |
| 2,472,059 | Arwood | June 7, 1949 |
| 2,689,909 | Dazley | Sept. 21, 1954 |
| 2,690,317 | Hoffmann | Sept. 28, 1954 |

UNITED STATES PATENT OFFICE
CERTIFICATE OF CORRECTION

Patent No. 2,900,152                                        August 18, 1959

Frank J. Hahn

It is hereby certified that error appears in the printed specification of the above numbered patent requiring correction and that the said Letters Patent should read as corrected below.

Column 4, line 8, before "portion", first occurrence, insert -- post --; line 25, for "post, a" read -- post, and a --.

Signed and sealed this 19th day of January 1960.

(SEAL)
Attest:

KARL H. AXLINE                                        ROBERT C. WATSON

Attesting Officer                                      Commissioner of Patents